3,578,460
PROCESS FOR THE PREPARATION OF PROTEINACEOUS MATERIALS
Lloyd E. Weeks, Creve Coeur, and Bernard S. Wildi, Kirkwood, Mo., assignors to Monsanto Company, St. Louis, Mo.
No Drawing. Filed Dec. 12, 1968, Ser. No. 783,391
Int. Cl. A23j 3/00
U.S. Cl. 99—7        8 Claims

ABSTRACT OF THE DISCLOSURE

An edible proteinaceous material having nutritional value is prepared by digesting non-edible protein materials from domestic animals, for example, feathers, in a liquid medium comprising water, keratinase and a reductive-type disulfide splitting agent. Reductive-type disulfide splitting agents are exemplified by mercaptoethanol and sodium sulfite. The procedure is typically carried out at a temperature in the range of from about 10° to about 70° C. The proteinaceous material is useful in animal feed compositions.

BACKGROUND OF THE INVENTION

Field of the invention

This invention relates to a process for preparing an edible and nutritious proteinaceous material. In a particular aspect, this invention relates to a process for preparing an edible and nutritious proteinaceous material from non-edible protein materials, by subjecting said protein material to the digestive action of a liquid medium comprising water, keratinase and a reductive-type disulfide splitting agent.

Description of the prior art

The economic need for the utilization of non-edible protein-containing waste products, such as feathers, hair, nails, offal, obtained in the processing of domestic animals is well recognized. Toward this end various procedures for the conversion of such non-edible protein materials to edible form have been provided by the prior art with varying degrees of success. One prior art procedure involves digesting the non-edible protein in an aqueous medium containing the enzyme keratinase. Another procedure involves digesting the non-edible protein material in a liquid medium comprising water, a lower-aliphatic alcohol and a reductive-type disulfide splitting agent, such as mercaptoethanol. For successful operation, the above described procedures necessarily employ temperatures in excess of 100° C. Without the use of such elevated temperatures, the time required for digestion is so extended as to make the procedures economically unacceptable. On the other hand, the use of elevated temperatures is also disadvantageeous in that such temperatures tend to degrade certain nutritionally important amino acids, such as, cystine, isoleucine, threonine, serine and arginine, and thereby significantly lower the nutritional value of the protein material.

SUMMARY OF THE INVENTION

It is an object of the present invention to provide a process for preparing an edible proteinaceous material rich in nutritionally valuable amino acids.

It is a further object of the present invention, to provide a process for preparing an edible and nutritious proteinaceous material from non-edible protein obtained from domestic animals, which process does not adversely affect the nutritional value of the proteinaceous material.

It is a still further object of the present invention to provide a process for preparing an edible and nutritious proteinaceous material from non-edible protein obtained from domestic animals, without the employment of extended periods of time.

Other objects and advantages of the present invention will be apparent from the specification and appended claims.

The present invention resides in the discovery that non-edible protein materials obtained from domestic animals are converted to an edible proteinaceous material without degradation of amino acids by subjecting the protein material to the action of a liquid digestive medium comprising water, keratinase and a reductive-type disulfide splitting agent, for a period of time and at a temperature sufficient to digest the protein material.

DETAILED DESCRIPTION

The liquid digestive medium employed in the process of the present invention comprises water, keratinase, and a reductive-type disulfide splitting agent (hereinafter sometimes referred to as "reducing agent"). Other materials such as buffering agents and surfactants may be included in the liquid digestive medium if desired. The liquid digestive medium may be prepared by any suitable procedure, as for example, by mixing keratinase and the reducing agent in water. The concentrations of keratinase and reducing agent in the liquid digestive medium may vary over a wide raneg and any suitable concentrations may be employed. Typically, the medium is a dilute aqueous solution containing from about 0.1 to about 5.0% by weight of each of the reducing agent and keratinase. The ratio of reducing agent to keratinase may also vary over a wide range, with a weight ratio of reducing agent to keratinase, in the range of from about 10:1 to about 1:5 being typically employed. A ratio of reducing agent to keratinase of in the range of from about 3:1 to about 1:1 is generally preferred.

Keratinase enzyme is known to the art and is obtained by cultivating a keratinase producing microorganism in a nutrient fermentation medium. Examples of microorganisms used in the preparation of keratinase include keratinase-producing microorganism of the Streptomyces and Anixiopis genera, such as for example, *Streptomyces fradiae* and *Anixiopis recticulispora*. A particular strain of microorganism used in the preparation of keratinase, is a strain of *Anixiopis recticulispora* described in U.S. Pat. 3,173,847 and designated as *Anixiopis recticulispora* ATCC 14362.

Any suitable reductive-type disulfide splitting agent (reducing agent) may be used in the process of the present invention. Such reducing agents are known to the art and include mercaptoethanol, sodium sulfite, sodium sulfide, potassium sulfite, sodium hydrosulfite, potassium hydrosulfite, sodium metabisulfite, zinc chlorobenzoate, hydrogen sulfide, cystine, thioglycollic acid, mixtures of the foregoing and the like. Because of the excellent results obtained therewith, mercaptoethanol, sodium sulfite and mixtures thereof are preferred in the process of the present invention.

Any suitable non-edible protein material obtained from domestic animals may be used in the process of the present invention. Such materials typically include keratinaceous materials such as hair, nails, hoofs and feathers from chickens, turkeys, hogs, cattle and the like, and other non-edible protein materials obtained for example from the butchering of domestic animals, such as blood, entrails, lungs, etc. and the like. It is preferred in order to shorten digestive time, that the non-edible protein material be first ground, chopped, or otherwise converted to small uniform particles.

In carrying out the process of the present invention, the non-edible protein material is subjected to the action of the liquid digestive medium at a temperature and for a period of time sufficient to digest the protein material but insufficient to cause substantial degradation of amino acids. Temperatures in the range of from about 10° to about 70° C. are typically employed in the process, with temperatures in the range of from about 25° to about 55° C. being preferred. Temperatures above about 70° C. tend to cause degradation of valuable amino acids and, therefore, should be avoided especially for extended periods of time. While temperatures below about 10° C. may be employed, such temperatures are generally not practical because of the slow rate of digestion of the protein material. Complete digestion is typically accomplished in from about 1 to about 24 hours. While any suitable pH may be employed, it is preferred that the pH of the medium be not in excess of about 10 and especially preferred that the pH be in the range of from about 4 to about 9. If desired, the time of digestion can be further shortened by treatment of the protein material, with, for example, steam or alcohol, prior to treatment with keratinase and reducing agent. The pretreatment preferably should not be of such duration as to permit substantial degradation of amino acids. A short pretreatment with steam is particularly preferred since it serves most satisfactorily to sterilize the protein material.

The digested proteinaceous material produced in accordance with the present invention can be recovered from the liquid digestive medium by any suitable procedure. For example, the proteinaceous material can be recovered by spray-drying, oven-drying or by simple evaporation. The proteinaceous material may also be recovered by precipitation, as for example, with a salt, such as magnesium sulfate, in the known manner. The recovered material may be incorporated into an animal feed composition and serves as a source of protein in the feed. If desired, the liquid medium containing the digested protein may be absorbed, as for example, by spraying onto an absorbent edible carrier having nutritional value, and then fed directly to the animal. Examples of suitable carriers include soy grits, wheat middlings, corn meal, fish meal, ground corn cobs, etc. and the like. The liquid medium may also be dried, as for example, by evaporation, and then fed directly to the animal.

The invention will be understood more fully by reference to the following specific examples. It is understood that the examples are presented for the purpose of illustration only and are not intended as a limitation of the invention.

EXAMPLE 1

(A) A solution was prepared by mixing 0.25 g. of mercaptoethanol, 0.10 g. sodium sulfite and 0.25 g. keratinase enzyme (as an aqueous solution) in 10 ml. of water. To the resulting solution was added 0.1 g. of ground chicken feathers of particle size sufficient to pass a 30-mesh screen. The resulting mixture was stirred at room temperature (approximately 25° C.) for 21 hours. Complete digestion as evidenced by total solubilization of the feathers was obtained.

(B) For comparative purposes, the above procedure was repeated exactly, with the exception that sodium sulfite and mercaptoethanol were not included in the solution. No digestion of the feathers was obtained.

A comparison of the results of the above test effectively shows the improvement obtained in the digestion of feathers with an aqueous digestive medium containing reducing agent and keratinase, over an aqueous digestive medium containing keratinase alone.

EXAMPLE 2

(A) A solution was prepared by mixing 0.24 g. of mercaptoethanol, 0.10 g. sodium sulfite and 0.25 g. keratinase (as an aqueous solution) in 10 ml. of water. To the resulting solution was added 0.1 g. of ground chicken feathers of particle size sufficient to pass a 30-mesh screen. The resulting mixture was gently heated at 37° C. with stirring for one hour. At the completion of the one hour period digestion of the feathers was substantially complete.

(B) For comparative purposes, the above procedure was repeated exactly, with the exception that keratinase was not included in the solution. At the completion of one hour, no digestion of feathers was observed. Heating at 37° C. was continued for an additional 15 hour period. At the completion of the additional heating period, no digestion of feathers was observed.

A comparison of the results from the above tests effectively shows the improvement obtained in the digestion of feathers with an aqueous digestive medium containing reducing agent and keratinase, over an aqueous digestive medium containing reducing agent alone.

Additional examples of the digestion of non-edible protein materials in accordance with the process of the present invention are given in Table I. In each experiment a solution of keratinase and reducing agent in water was prepared. Ground feathers were added to the solution and the resulting mixture was stirred at the temperature and for the period of time indicated in the table:

TABLE I

| Ex. No. | Reducing agents | Temp., °C. | Time, hours | Result |
|---|---|---|---|---|
| 3 | Mercaptioethanol | 37 | 16 | Complete digestion. |
| 4 | Sodium sulfite | 37 | 16 | Partial digestion. |
| 5 | Mercaptoethanol | 25 | 21 | Do. |
| 6 | {Mercaptoethanol, Sodium sulfite} | 25 | 21 | Complete digestion. |

EXAMPLE 7

The procedure of Example 1, part A, is repeated in all essential details, with the exception that zinc chlorobenzoate is substituted for mercaptoethanol and sodium sulfite. Digestion of the feathers is obtained.

EXAMPLE 8

The procedure of Example 1, part A, is repeated in all essential details, with the exception that hair obtained from hogs is substituted for chicken feathers. Digestion of the hair is obtained.

EXAMPLE 9

The procedure of Example 1, part A, is repeated in all essential details, with the exception that offal obtained from the butchering of cattle is substituted for chicken feathers. Digestion of the offal is obtained.

It is apparent that other reducing agents may be employed in the process of the present invention, and such materials are considered equivalents of the subject matter sought to be patented.

Since many embodiments of this invention may be made, and since many changes may be made in the embodiments described, the foregoing is to be interpreted as illustrative only and the invention is defined by the claims appended hereto.

What is claimed is:

1. A process for the preparation of an edible and digestible proteinaceous material rich in nutritionally valuable amino acids and useful in animal feed compositions which comprises subjecting non-edible protein material obtained from domestic animals to the action of a liquid medium consisting essentially of water, keratinase and a disulfide splitting agent, the pH of the said medium being from about 4 to about 10, at a temperature from about 10° to about 70° C. and for a period of time sufficient to digest the protein material, the temperature and the time at said temperature being limited to avoid substantial degradation of amino acids.

2. The process of claim 1, wherein the disulfide splitting agent is mercaptoethanol.

3. The process of claim 1, wherein the disulfide splitting agent is sodium sulfite.

4. The process of claim 1, wherein the disulfide splitting agent is a mixture of mercaptoethanol and sodium sulfite.

5. The process of claim 1, wherein the liquid medium contains from about 0.1 to about 5.0% by weight of keratinase, and from about 0.1 to about 5.0% by weight of disulfide splitting agent.

6. The process of claim 1, wherein the weight ratio of disulfide splitting agent to keratinase is in the range of from about 10:1 to about 1:5.

7. The process of claim 1, wherein the nonedible protein material is a keratinaceous material.

8. The process of claim 7, wherein the keratinaceous material is feathers.

References Cited

UNITED STATES PATENTS

| | | | |
|---|---|---|---|
| 2,474,339 | 6/1949 | Ward et al. | 260—123.7X |
| 2,521,582 | 9/1950 | Keil et al. | 195—29 |
| 2,814,851 | 12/1957 | Hervey | 260—123.7 |
| 2,817,342 | 12/1957 | Henkin | 195—68X |
| 2,988,487 | 6/1961 | Nickerson et al. | 195—66X |
| 2,993,794 | 7/1961 | Moshy | 99—18 |
| 3,096,253 | 7/1963 | Koh et al. | 195—62 |
| 3,173,847 | 3/1965 | Kita et al. | 195—5 |
| 2,857,317 | 10/1958 | Grimm | 195—6 |

FOREIGN PATENTS

| | | | |
|---|---|---|---|
| 414,778 | 8/1934 | Great Britain | 195—5 |
| 29,673 | 10/1930 | Australia | 195—6 |

NORMAN YUDKOFF, Primary Examiner

F. E. DRUMMOND, Assistant Examiner

U.S. Cl. X.R.

99—2, 18; 195—5; 260—534